(12) United States Patent
Krämer et al.

(10) Patent No.: US 6,209,967 B1
(45) Date of Patent: Apr. 3, 2001

(54) PNEUMATIC BRAKE POWER BOOSTER WITH CONTROL HOUSING HAVING AN ELECTROMAGNETICALLY OPERABLE CONTROL VALVE

(75) Inventors: Horst Krämer, Dietzenbach; Jose Gonzales, Idstein; Michael Vogt, Simmern; Peter Drott; Uwe Kley, both of Frankfurt am Main, all of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 08/981,160

(22) PCT Filed: May 31, 1996

(86) PCT No.: PCT/EP96/02355

§ 371 Date: Feb. 27, 1998

§ 102(e) Date: Feb. 27, 1998

(87) PCT Pub. No.: WO97/01471

PCT Pub. Date: Jan. 16, 1997

(30) Foreign Application Priority Data

Jun. 24, 1995 (DE) .............................................. 195 23 022

(51) Int. Cl.$^7$ ................................................... B60T 13/68
(52) U.S. Cl. ......................................... 303/114.3; 60/545
(58) Field of Search ..................... 303/114.3; 188/356, 188/357; 60/545, 547.1, 547.2, 547.3

(56) References Cited

U.S. PATENT DOCUMENTS

| 5,479,844 | * | 1/1996 | Heibel et al. | 303/114.3 |
| 5,647,462 | * | 7/1997 | Tsubouchi et al. | 303/114.3 |
| 5,833,327 | * | 11/1998 | Kozakai | 303/114.3 |

FOREIGN PATENT DOCUMENTS

| 3920766A1 | 6/1989 | (DE) . |
| 4227879A1 | 2/1994 | (DE) . |
| 4238333A1 | 5/1994 | (DE) . |
| 94/11226 | 5/1994 | (WO) . |

* cited by examiner

Primary Examiner—Matthew C. Graham
(74) Attorney, Agent, or Firm—Rader, Fishman & Grauer PLLC

(57) ABSTRACT

A brake power booster for automotive vehicles includes a control valve that is operable by an electromagnet irrespective of an actuating rod displacing a valve piston, the electromagnet actuating a third sealing seat which permits ventilation of the working chamber. The valve member of the control valve has passages which allow a pneumatic pressure compensation. To eliminate a pneumatic force component which counteracts the force generated by the electromagnet, the passages are provided radially outside the area delimited by the electromagnetically operable sealing seat on the sealing surface of the valve member.

5 Claims, 2 Drawing Sheets

PNEUMATIC BRAKE POWER BOOSTER WITH CONTROL HOUSING HAVING AN ELECTROMAGNETICALLY OPERABLE CONTROL VALVE

BACKGROUND OF THE INVENTION

The present invention relates to a pneumatic brake power booster for automotive vehicles including a booster housing with an interior which is subdivided by a movable wall into a first chamber (vacuum chamber) and a second chamber (working chamber), and a control housing accommodating a control valve which controls a pneumatic pressure difference acting upon the movable wall, the control valve including at least two sealing seats that cooperate with an elastic valve member, and being operable by an actuating rod, on the one hand, and irrespective of the actuating rod by an electromagnet, on the other hand, the armature of the electromagnet cooperating in a force-transmitting way with one of the sealing seats, and the valve member confines a pneumatic chamber in the control housing which can be acted upon by the pneumatic pressure prevailing in the second chamber through passages provided in the sealing surface of the valve member.

International patent application No. WO 94/11226 discloses a brake power booster of this type. A disadvantage of the prior art brake power booster is the effect of an annular surface on the valve member of the control valve, more particularly, in the release action with the electromagnet activated. The annular surface is limited, on the one hand, by the radially outward sealing lip of the valve member and, on the other hand, by the third sealing seat which bears against the sealing surface of the valve member. The annular surface which is acted upon by the pneumatic differential pressure prevailing in the housing of the brake power booster during its operation generates a force component. The force component counteracts the independent actuating force generated by the electromagnet and must be compensated by a corresponding rating of a piston rod return spring which retracts the valve piston of the control valve.

Therefore, an object of the present invention is to disclose measures which permit eliminating the disturbing effect of the above-mentioned force components.

SUMMARY OF THE INVENTION

According to the present invention, this object is achieved because the passages are provided radially outside the area which is limited by the electromagnetically operable sealing seat on the sealing surface of the valve member.

Preferably, the pneumatic chamber is confined by a cylindrical attachment provided on the housing of the electromagnet and sealed and guided in the control housing.

The present invention will be explained in detail in the following description of an embodiment, making reference to the accompanying drawings.

DETAILED DESCRIPTION OF THE DRAWINGS

Figure 1:
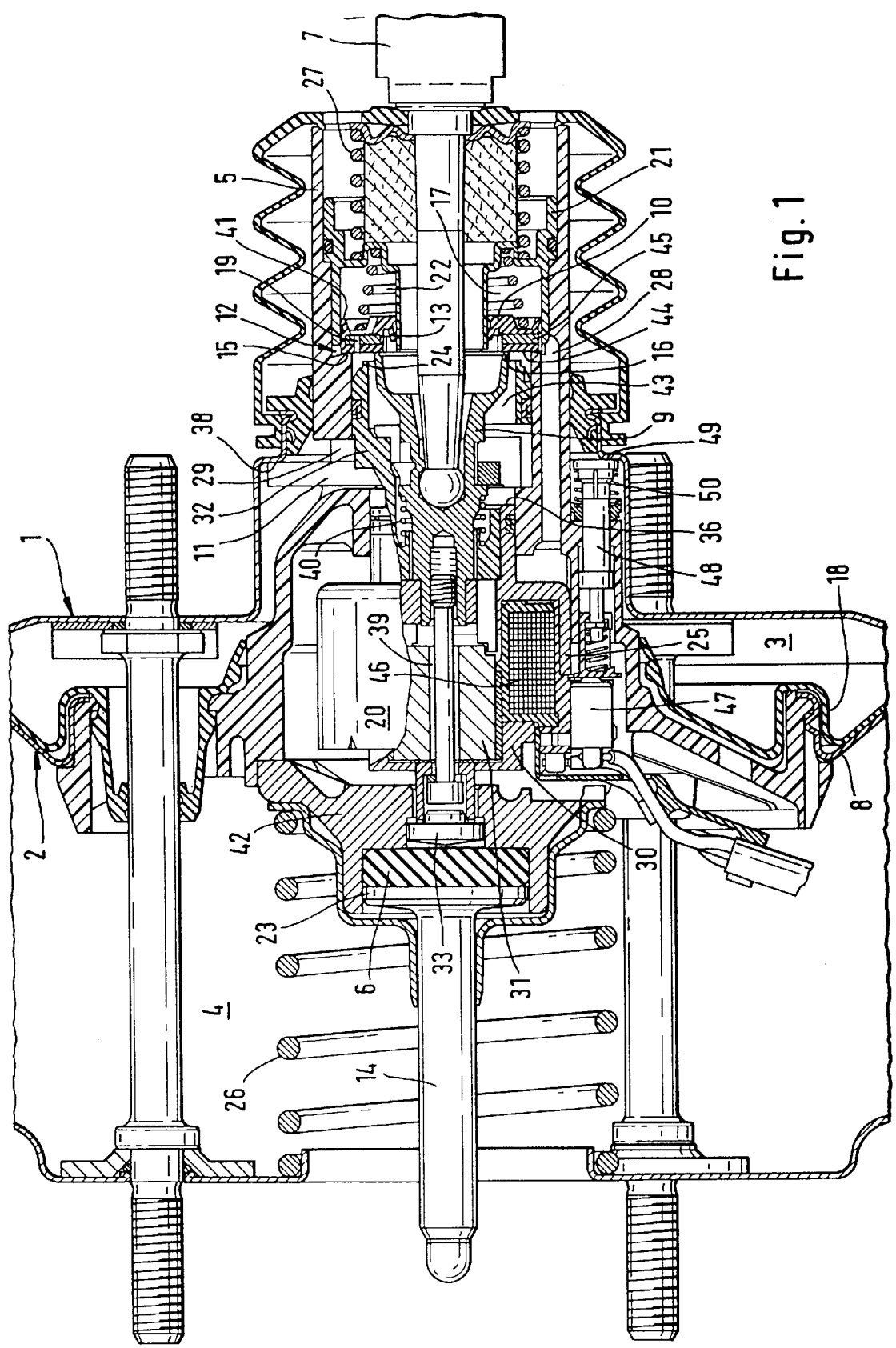
FIG. 1 is a longitudinal cross-sectional view, partly broken away, of an embodiment of the brake power booster of the present invention, in the inactive initial setting.

The booster housing 1 (shown only schematically) of the vacuum brake power booster of the present invention shown is subdivided into a working chamber 3 and a vacuum chamber 4 by an axially movable wall 2. The axially movable wall 2 includes a diaphragm plate 8, deepdrawn from sheet metal, and a flexible diaphragm 18 which abuts thereon (not shown). Diaphragm 18, configured as a rolling diaphragm, provides a sealing between the outside periphery of the diaphragm plate 8 and the booster housing 1.

A control valve 12 operable by an actuating rod 7 is accommodated in a control housing 5 which is sealed and guided in the booster housing 1 and carries the movable wall 2. The control valve 12 is composed of a first sealing seat 15 provided on the control housing 5, a second sealing seat 16 provided on a valve piston 9 coupled to the actuating rod 7, as well as an annular valve member 10 cooperating with the two sealing seats 15, 16. Valve member 10 is guided in a guide part 21 sealed in control housing 5 and is urged against the valve seats 15, 16 by a valve spring 22 which is supported on the guide part 21. The working chamber 3 is connectable to the vacuum chamber 4 through a channel 28 which extends laterally in the control housing 5.

By way of a rubber-elastic reaction disc 6 abutting on a frontal end 42 of the control housing 5 and a push rod 14 including a head flange 23, the brake force is transmitted onto an actuating piston of a non-illustrated master cylinder of the brake system. The master cylinder is arranged on the vacuum-side booster housing half not shown.

A resetting spring 26, illustrated schematically in the drawing and supported on the vacuum-side front wall of the booster housing 1, keeps the movable wall 2 in the initial position shown. Further, there is provision of a second compression spring or piston-rod return spring 27 which is supported indirectly on the actuating rod 7, on the one hand, and on the guide part 21, on the other hand. The force of spring 27 causes the valve piston 9 or its sealing seat 16 to be biassed in relation to the valve member 10.

To connect the working chamber 3 to the atmosphere when the control valve 12 is actuated, finally, a channel 29, which extends in a generally radial direction, is provided in the control housing 5. The return movement of the valve piston 9 at the end of a braking operation is limited by a transverse member 11 which, in the release position of the vacuum brake power booster shown in the drawing, abuts on a stop 38 provided in the booster housing 1.

Further, as can be gathered from the drawing, the valve member 10 includes an annular sealing surface 44 which cooperates with the two sealing seats 15, 16. Sealing surface 44 is reinforced by means of a metal reinforcing disc 45 and has a plurality of axial ducts 19. In addition, the valve member 10 has a radially inwardly arranged sealing lip 13 and a radially outwardly arranged second sealing lip 41 which, in the mounted condition of the valve member 10 in the control housing 5, are in sealing abutment with the previously mentioned guide part 21 that guides the valve member 10. This confines a pneumatic chamber 17 in the control housing 5. The flow channels which are formed by the ducts 19 and the openings in the sealing surface 44 (not referred to in detail) connect the pneumatic chamber 17 with an annular chamber 43 which is confined by the sealing seats 15, 16 and opening into which is the above-mentioned pneumatic channel 29. Thus, the pneumatic chamber 17 which is provided on the side of the valve member 10 remote from the sealing surface 44, is in constant communication with the working chamber 3, and pressure compensation takes place at the valve member 10.

Consequently, the arrangement described permits reducing the difference between the reaction force of the brake power booster and the resetting force acting on the valve piston to the effect that, with the reaction force remaining the same, an increase in the resetting force is possible or, with the resetting force remaining the same, a reduction in the reaction force is possible. As a result, the hysteresis of the brake power booster according to the present invention is improved.

To initiate an independent actuation of the vacuum brake power booster according to the present invention which is irrespective of the actuating rod 7, a third sealing seat 24 is interposed radially between the first (15) and the second sealing seat 16. Sealing seat 24 is operable by means of an electromagnet 20 which, preferably, is arranged in a housing 25 rigidly connected to the valve piston 9 and, consequently, is displaceable together with the valve piston 9 in the control housing 5. The electromagnet 20 includes a coil 46 arranged within the housing 25 and a cylindrical armature 31 which is axially slidably arranged therein. Armature 31 is partly guided in a closure part 30 that closes the housing 25 and on which a sleeve 32 is supported that carries the above mentioned third sealing seat 24. Interposed between the valve piston 9 and the sleeve 32 is a compression spring 40 which retains the armature 31 in its initial position where the third sealing seat 24 is arranged in an axially offset manner with respect to the second sealing seat 16 on the valve piston 9. The closure part 30 guided in the control housing 5 abuts the above mentioned reaction disc 6, by the intermediary of a transmission disc 33, and permits transmitting the input force introduced at the actuating rod 7 to the reaction disc 6.

The arrangement or provision of the above-mentioned passages 19 in the valve member 10 of the control valve 12 is preferably chosen so that their distance from the longitudinal axis of the brake power booster is greater than the radius of the third sealing seat 24 so that the passages 19 are radially outside the area limited by the sealing seat 24 on the sealing surface 44 when the third sealing seat 24 abuts on the sealing surface 44.

In the embodiment of the brake power booster of the present invention shown in the drawing, electric switching means 47, 48 are provided. Means 47, 48 are especially important in braking operations where the electromagnet 20 is driven in addition to the operation by the driver in order to effect an emergency stop irrespective of the driver's wish (so-called brake assistant function). It is of special significance that the switching means 47, 48 are actuated during each braking operation. It must be ensured simultaneously that the electromagnet 20 is reliably deactivated upon termination of the braking operation assisted by independent force. The switching means shown include a microswitch 47, which is preferably attached to the valve piston 9 or the housing 25 of the electromagnet 20 and has two switch positions, and an actuating element 48. Element 48 actuates the microswitch 47 by a translatory movement. Element 48 is sealed and guided in a bore in the control housing 5 and cooperates with a stop on the booster housing. The stop is assigned reference numeral 49 and may be configured as a radial collar on the rear booster housing half. A compression spring 50 is interposed between the actuating element 48 and the control housing 5 so that the end of the actuating element 48 remote from the microswitch 47 is biassed to bear against stop 50.

The operation of the independently operable brake power booster described or illustrated herein is exactly described in International Patent Application No. WO 94/11226, which is incorporated herein by reference. The need for a repetition in the present text is thus obviated.

Figure 2:
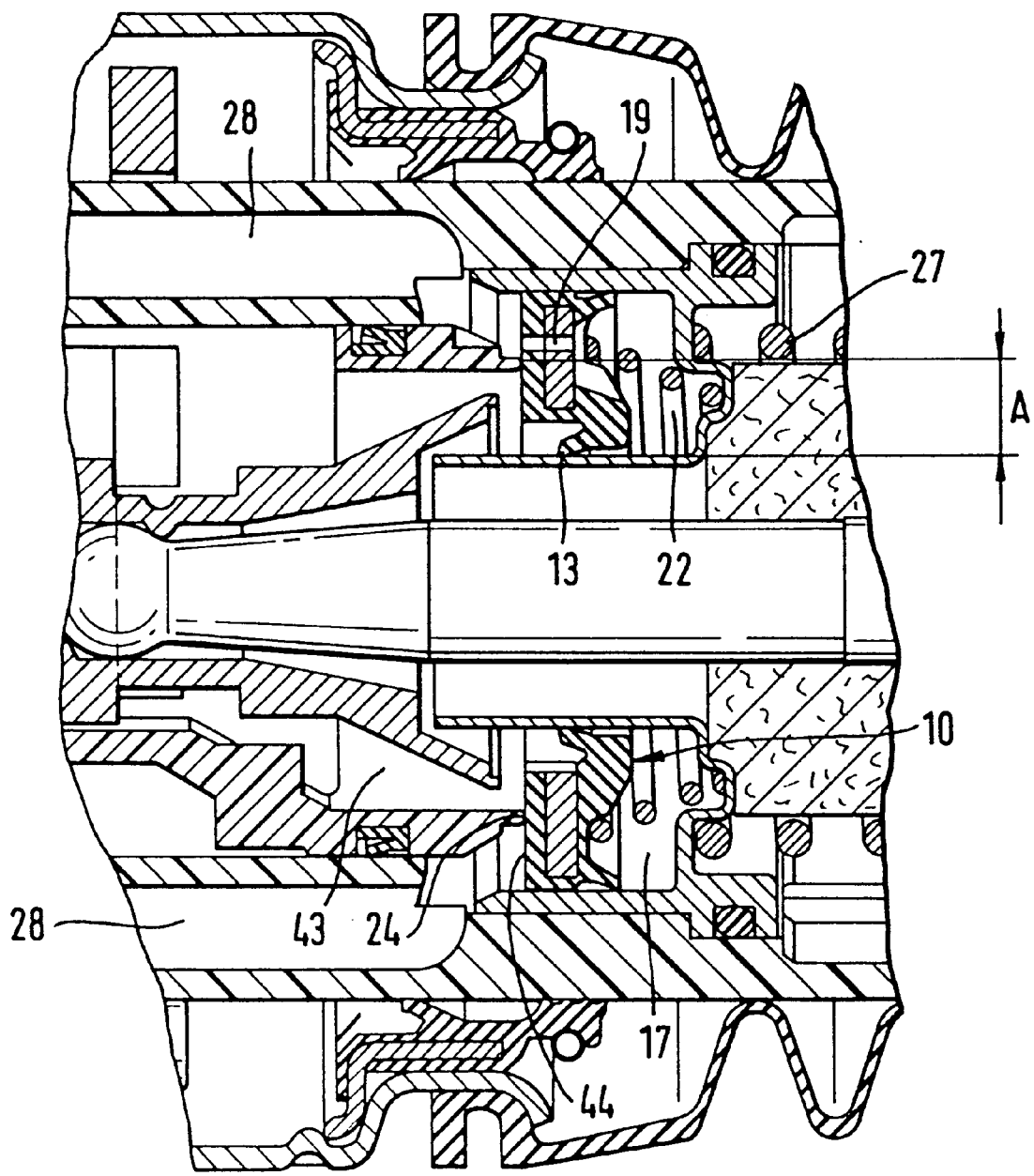
FIG. 2 is a view of the control valve of the brake power booster shown in the embodiment of FIG. 1, with the electromagnet activated.

As can be seen especially in FIG. 2, the third sealing seat 24, during its abutment on the sealing surface 44 of the valve member 10, limits an annular surface A along with its radially inward sealing lip 13. Annular surface A is exposed to the action of the pneumatic differential pressure prevailing in the booster housing 1 in the condition of an independent operation of the control valve 12 shown in FIG. 2. The reason is the pneumatic channels or ducts 19 in the valve member 10 which (by way of the vacuum channels 28 mentioned with respect to FIG. 1) permit a pneumatic pressure compensation between the front (vacuum) chamber 4 and the pneumatic annular chamber 18 bounded in the retaining member 21. Thus, vacuum prevails in the chamber 17, and atmospheric pressure prevails in chamber 43. This develops a pneumatic force component which acts in the actuating direction of the third sealing seat 29 or the electromagnet and assists the effect of the piston rod return spring 27.

What is claimed is:

1. A pneumatic brake power booster for automotive vehicles, comprising:

a booster housings with an interior which is subdivided by a movable wall into a first chamber and a second chamber, a control housing accommodating a control valve which controls a pneumatic pressure difference acting upon the movable wall, wherein the control valve includes at least two sealing seats that cooperate with a sealing surface of an elastic valve member, wherein one of said sealing seats is operable by an actuating rod, and wherein the remaining sealing seat is operable, irrespective of the position of the actuating rod, by an electromagnet with an armature that cooperates in a force-transmitting way with one of the sealing seats, wherein the elastic valve member confines a pneumatic chamber in the control housing, and includes through passages in the sealing surface of the valve member, and further wherein the through passages are located radially outside an area which is limited by the electromagnetically operable sealing seat on the sealing surface of the elastic valve member, whereby pressure compensation between the pneumatic chamber and the second chamber takes place at the elastic valve member.

2. The brake power booster as claimed in claim 1, wherein the sealing seat operable by the armature is a sealing seat which, when opened, permits ventilation of the second chamber.

3. The brake power booster as claimed in claim 1, wherein the sealing seat operable by the armature is a third sealing seat which is arranged concentrically relative to the other two sealing seats, and which, on actuation of the control valve by the electromagnet, provides a pneumatic connection between the two chambers.

4. The brake power booster as claimed in claim 3, wherein the third sealing seat is provided on a force-transmitting sleeve which is sealed in the control housing and slidable by the armature.

5. The brake power booster as claimed in claim 1, wherein the pneumatic chamber confined by the valve member is provided in a retaining member which is sealed in the control housing and forms a radially inward and a radially outward boundary of the pneumatic chamber.

\* \* \* \* \*